(12) United States Patent
Farmer et al.

(10) Patent No.: US 11,549,053 B2
(45) Date of Patent: Jan. 10, 2023

(54) COMPOSITIONS AND METHODS FOR ENHANCED OIL RECOVERY FROM LOW PERMEABILITY FORMATIONS

(71) Applicant: Locus Solutions IPCo, LLC, Solon, OH (US)

(72) Inventors: Sean Farmer, Ft. Lauderdale, FL (US); Ken Alibek, Solon, OH (US); Andrew R Lefkowitz, Solon, OH (US); Karthik N Karathur, Solon, OH (US); Martin R Shumway, Solon, OH (US); Alibek Moldakozhayev, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 0 days.

(21) Appl. No.: 17/264,830

(22) PCT Filed: Jul. 29, 2019

(86) PCT No.: PCT/US2019/043919
§ 371 (c)(1),
(2) Date: Jan. 31, 2021

(87) PCT Pub. No.: WO2020/028253
PCT Pub. Date: Feb. 6, 2020

(65) Prior Publication Data
US 2021/0292637 A1 Sep. 23, 2021

Related U.S. Application Data

(60) Provisional application No. 62/711,864, filed on Jul. 30, 2018.

(51) Int. Cl.
*E21B 33/138* (2006.01)
*C09K 8/584* (2006.01)
(Continued)

(52) U.S. Cl.
CPC ............ *C09K 8/584* (2013.01); *E21B 33/138* (2013.01); *E21B 43/164* (2013.01); *E21B 43/20* (2013.01)

(58) Field of Classification Search
CPC ...... C09K 8/584; E21B 33/138; E21B 43/164
(Continued)

(56) References Cited

U.S. PATENT DOCUMENTS

| 3,191,676 A | 6/1965 | Froning |
| 3,581,824 A | 6/1971 | Hurd |

(Continued)

FOREIGN PATENT DOCUMENTS

| CN | 102352227 A | 2/2012 |
| CN | 102399547 A | 4/2012 |

(Continued)

OTHER PUBLICATIONS

Amani, H., et al., "Comparative study of biosurfactant producing bacteria in MEOR applications." Journal of Petroleum Science and Engineering, 2010, 75: 209-214.
(Continued)

*Primary Examiner* — Zakiya W Bates
*Assistant Examiner* — Ashish K Varma
(74) *Attorney, Agent, or Firm* — Saliwanchik, Lloyd & Eisenschenk (57) ABSTRACT

The present invention provides compositions and methods for enhancing oil recovery from low permeability subterranean formation using three mechanisms: repressurization; reduction of interfacial tension; and increased permeability. The subject compositions comprise a chelating agent, a biosurfactant, a carbonate or bicarbonate salt, water, and a pH adjusting substance, which when applied to an oil-bearing formation according to the methods of the subject invention, allow for controlled release of carbon dioxide (Continued)

within the formation without complicated machinery or gas-producing microorganisms.

9 Claims, 4 Drawing Sheets

(51) Int. Cl.
　　　E21B 43/16　　　(2006.01)
　　　E21B 43/20　　　(2006.01)
(58) Field of Classification Search
　　　USPC .......................................................... 166/292
　　　See application file for complete search history.

(56) References Cited

U.S. PATENT DOCUMENTS

| | | | |
|---|---|---|---|
| 3,871,956 A | 3/1975 | Azarowics | |
| 4,369,125 A | 1/1983 | Kragen et al. | |
| 4,450,908 A | 5/1984 | Hitzman | |
| 4,487,262 A * | 12/1984 | Venkatesan | C09K 8/592 |
| | | | 166/402 |
| 4,522,261 A | 6/1985 | McInerney et al. | |
| 4,561,501 A * | 12/1985 | Shaw | C09K 8/584 |
| | | | 507/936 |
| 4,793,826 A | 12/1988 | Hayes et al. | |
| 4,905,761 A | 3/1990 | Bryant | |
| 5,156,652 A | 10/1992 | Gregoli et al. | |
| 5,165,477 A | 11/1992 | Shell et al. | |
| 5,284,576 A | 2/1994 | Weers et al. | |
| 5,869,325 A | 2/1999 | Crabtree et al. | |
| 6,033,901 A | 3/2000 | Powell, Jr. | |
| 6,942,037 B1 | 9/2005 | Arnold et al. | |
| 7,472,747 B1 | 1/2009 | Brigmon et al. | |
| 7,677,673 B2 | 3/2010 | Tranquilla et al. | |
| 7,681,638 B2 | 3/2010 | Soni et al. | |
| 8,188,012 B2 | 5/2012 | Weerasooriya et al. | |
| 8,316,933 B2 | 11/2012 | Kohr | |
| 9,422,470 B2 | 8/2016 | Xu et al. | |
| 9,550,937 B2 | 1/2017 | Campbell et al. | |
| 9,683,164 B2 | 6/2017 | Gunawan et al. | |
| 9,725,986 B2 | 8/2017 | Xu et al. | |
| 9,884,986 B2 | 2/2018 | Gunawan et al. | |
| 10,011,761 B2 * | 7/2018 | Alwattari | C09K 8/604 |
| 10,023,787 B2 | 7/2018 | Benoit et al. | |
| 10,190,038 B2 | 1/2019 | Armstrong et al. | |
| 2001/0056047 A1 | 12/2001 | Meine et al. | |
| 2004/0231845 A1 | 11/2004 | Cooke, Jr. | |
| 2007/0092930 A1 | 4/2007 | Lal et al. | |
| 2007/0125536 A1 | 6/2007 | Acock et al. | |
| 2007/0151726 A1 | 7/2007 | Crews et al. | |
| 2008/0167445 A1 | 7/2008 | Podella et al. | |
| 2008/0280789 A1 | 11/2008 | Welton et al. | |
| 2008/0302531 A1 | 12/2008 | Berger et al. | |
| 2009/0029879 A1 | 1/2009 | Soni et al. | |
| 2010/0044031 A1 | 2/2010 | Fallon et al. | |
| 2010/0163230 A1 | 7/2010 | Kotlar | |
| 2011/0139262 A1 | 6/2011 | Aburto Anell et al. | |
| 2011/0290482 A1 * | 12/2011 | Weerasooriya | C09K 8/588 |
| | | | 507/225 |
| 2012/0037368 A1 | 2/2012 | Eick et al. | |
| 2012/0055685 A1 * | 3/2012 | Sanders | E21B 43/164 |
| | | | 166/402 |
| 2012/0122740 A1 | 5/2012 | Roldan Carrillo et al. | |
| 2012/0292022 A1 | 11/2012 | Choban et al. | |
| 2013/0020082 A1 | 1/2013 | Lumsden | |
| 2013/0062053 A1 | 3/2013 | Kohr et al. | |
| 2013/0264060 A1 | 10/2013 | De Wolf et al. | |
| 2013/0319656 A1 | 12/2013 | Brownlee | |
| 2014/0073541 A1 | 3/2014 | Ravikiran et al. | |
| 2014/0273150 A1 | 9/2014 | Angel | |
| 2014/0305649 A1 | 10/2014 | Tang et al. | |
| 2014/0315765 A1 | 10/2014 | McDaniel | |
| 2014/0332212 A1 | 11/2014 | Ayers et al. | |
| 2014/0360727 A1 | 12/2014 | Milam et al. | |
| 2015/0037302 A1 | 2/2015 | Bralkowski et al. | |
| 2015/0068950 A1 | 3/2015 | See et al. | |
| 2015/0259642 A1 | 9/2015 | Sangwai et al. | |
| 2015/0300139 A1 | 10/2015 | Armstrong et al. | |
| 2016/0002521 A1 | 1/2016 | Dillon et al. | |
| 2016/0145487 A1 | 5/2016 | Alam et al. | |
| 2016/0160111 A1 | 6/2016 | Smith et al. | |
| 2016/0222280 A1 | 8/2016 | Kohr et al. | |
| 2016/0244347 A1 | 8/2016 | Angel | |
| 2016/0251565 A1 | 9/2016 | Yanagisawa et al. | |
| 2016/0333258 A1 | 11/2016 | Drake et al. | |
| 2017/0037301 A1 | 2/2017 | Alwattari | |
| 2017/0044424 A1 | 2/2017 | Dwarakanath et al. | |
| 2017/0138135 A1 | 5/2017 | Almutairi | |
| 2018/0201531 A1 | 7/2018 | Cohen et al. | |
| 2018/0282608 A1 | 10/2018 | Gopal et al. | |
| 2019/0292436 A1 | 9/2019 | Mason et al. | |
| 2019/0359562 A1 | 11/2019 | Lyman et al. | |

FOREIGN PATENT DOCUMENTS

| | | |
|---|---|---|
| CN | 102925397 A | 2/2013 |
| CN | 103449696 A | 12/2013 |
| CN | 104109646 A | 10/2014 |
| CN | 104974952 A | 10/2015 |
| CN | 105154050 A | 12/2015 |
| CN | 103614131 B | 1/2016 |
| CN | 105753283 A | 7/2016 |
| CN | 108373912 A | 8/2018 |
| GB | 2450204 A | 12/2008 |
| JP | 2010200695 A | 9/2010 |
| JP | 2016000017 A | 1/2016 |
| KR | 101481459 B1 | 1/2015 |
| WO | 2007129332 A1 | 11/2007 |
| WO | 2010111226 A2 | 9/2010 |
| WO | 2013110132 A1 | 8/2013 |
| WO | 2014152350 A1 | 9/2014 |
| WO | 2015093934 A1 | 6/2015 |
| WO | 2015167864 A1 | 11/2015 |
| WO | 2016196680 A1 | 12/2016 |
| WO | 2017040903 A1 | 3/2017 |
| WO | 2017044953 A1 | 3/2017 |
| WO | 2018049182 A2 | 3/2018 |
| WO | 2018107162 A1 | 6/2018 |
| WO | 2018129299 A1 | 7/2018 |
| WO | 2018148265 A2 | 8/2018 |
| WO | 2018148397 A3 | 8/2018 |
| WO | 2018160995 A1 | 9/2018 |
| WO | 2018191172 A1 | 10/2018 |
| WO | 2018231791 A1 | 12/2018 |
| WO | 2018237137 A1 | 12/2018 |
| WO | 2019022996 A1 | 1/2019 |
| WO | 2019022998 A1 | 1/2019 |
| WO | 2019046183 A1 | 3/2019 |
| WO | 2019067356 A1 | 4/2019 |
| WO | 2019089730 A1 | 5/2019 |
| WO | 2019094615 A1 | 5/2019 |
| WO | 2019133555 A1 | 7/2019 |
| WO | 2019191296 A1 | 10/2019 |
| WO | 2019200054 A1 | 10/2019 |
| WO | 2019204715 A1 | 10/2019 |
| WO | 2019213055 A1 | 11/2019 |
| WO | 2019222168 A1 | 11/2019 |
| WO | 2020006194 A1 | 1/2020 |

OTHER PUBLICATIONS

Amosa, M.K., et al., "Sulphide Scavengers in Oil and Gas Industry—A Review." NAFTA, 2010, 61(2): 85-92.

Castaneda, L.C., et al., "Current situation of emerging technologies for upgrading of heavy oils" Catalysis Today, 2014, 220-222: 248-273.

Das, N., et al., "Review Article Microbial Degradation of Petroleum Hydrocarbon Contaminants: An Overview." Biotechnology Research International, 2011, 2011: 941810, pp. 1-13.

Daverey, A., et al., "Production of sophorolipids by the yeast Candida bombicola using simple and low cost fermentative media." Food Research International, 2009, 42:499-504.

(56) References Cited

OTHER PUBLICATIONS

De Almeida, D., et al., "Biosurfactants: Promising Molecules for Petroleum Biotechnology Advances." Frontiers in Microbiology, Oct. 2016, 7(1718): 1-14.
De Brito, D., Biosurfactants from renewable raw materials, Universidade do Minho Departamento de Engenharia Biologica, Nov. 2013, pp. 1-93.
De Oliveira, M., et al., "Review: Sophorolipids A Promising Biosurfactant and it's Applications." International Journal of Advanced Biotechnology and Research, 2015, 6(2): 161-174.
Elshafie, A. E., et al., "Sophorolipids Production by Candida bombicola ATCC 22214 and its Potential Application in Microbial Enhanced Oil Recovery " Frontiers in Microbiology, Nov. 2015, 6(1324): 1-11.
El-Sheshtawy, H.S., et al., "Production of biosurfactants by Bacillus licheniformis and Candida albicans for application in microbial enhanced oil recovery." Egyptian Journal of Petroleum, 2016, 25: 293-298.
Ghojavand, H. et al., "Isolation of thermotolerant, halotolerant, facultative biosurfactant-producing bacteria." Appl. Microbiol. Biotechnol, Oct. 2008, 80(6): Abstract, doi: 10,1007/s00253-008-1570-7.
Gudina, E., et al., "Biosurfactant-producing and oil-degrading Bacillus subtilis strains enhance oil recovery in laboratory sand-pack columns." Journal of Hazardous Materials, 2013, 261: 106-113.
Ines, M., et al., "Glycolipids biosurfactants; potential related biomedical and biotechnical applications." Carbohydrate Research, 2015, 416: 59-69.
Kaur, K., et al., "Biosurfactant production by yeasts isolated from hydrocarbon polluted environments." Environ Monit Assess, 2017, 189 (603: 1-13.
Kurtzman, C.P., et al., "Production of sophorolipid biosurfactants by multiple species of the *Starmerella* (Candida) bombicolayeast clade." FEMS Microbiol Lett, 2010, 311: 140-146.
Liu, X., et al., "Recovery of crude oil from oily sludge in an oilfield by sophorolipid." Petroleum Science and Technology, 2019, 37(13): 1582-1588.
Ma, X., et al., "Surface and biological activity of sophorolipid molecules produced by *Wickerhamiella domercqiae* var. sophorolipid CGMCC 1576." Journal of Colloid and Interface Science, 2012, 376: 165-172.

Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.
Pacwa-Plociniczak, M. et al., "Review: Environmental Applications of Biosurfactants: Recent Advances." Int. J. Mol. Sci , 2011, 12: 633-654.
Rocha E Silva, F.C.P., et al., "Yeasts and bacterial biosurfactants as demulsifiers for petroleum derivative in seawater emulsions." AMB Expr., 2007, 7(202): 1-13.
Santos, D.K.F., et al., "Biosurfactants: Multifunctional Biomolecules of the 21st Century." International Journal of Molecular Sciences, 2016, 17(401): 1-31.
Sen, R., "Biosurfactants: Advances in Experimental Medicine and Biology." Landes Bioscience and Springer Science +Business Media, LLC, 2010, 672: 1-331.
Shah, M.U.H., et al., "Production of sophorolipids by Starmerella bombicola yeast using new hydrophobic substrates." Biochemical Engineering Journal, 2017, 127: 60-67.
Silva, R., et al., "Applications of Biosurfactants in the Petroleum Industry and the Remediation of Oil Spills." International Journal of Molecular Sciences, 2014, 15: 12523-12542.
Thaniyavarn, J., et al., "Production of Sophorolipid Biosurfactant by Pichia anomala." Bioscience, Biotechnology, and Biochemistry, 2008, 72(8): 2061-2068.
Umar, Z.D., et al., "Rapid biodegradation of polycyclic aromatic hydrocarbons (PAHs) using effective Cronobacter sakazakii MM045 (KT933253)." MethodsX, 2017, 4: 104-117.
Wadekar, S., et al., "Sophorolipid Production by *Starmerella bombicola* (ATCC 22214) from Virgin and Waste Frying Oils, and the Effects of Activated Earth Treatment of the Waste Oils." J Am Oil Chem Soc, 2012, 89: 1029-1039.
Youssef, N., et al., "In Situ Biosurfactant Production by Bacillus Strains Injected into a Limestone Petroleum Reservoir" Applied and Environmental Microbiology, Feb. 2007, 73(4): 1239-1247.
Zafra, G., et al., "Biodegradation of polycyclic aromatic hydrocarbons by *Trichoderma* species: a mini review." Environ Sci Pollut Res, 2015, 22: 19426-19433.

\* cited by examiner

COMPOSITIONS AND METHODS FOR ENHANCED OIL RECOVERY FROM LOW PERMEABILITY FORMATIONS

CROSS-REFERENCE TO RELATED APPLICATION

This application is a National Stage Application of International Application No. PCT/US2019/043919, filed Jul. 29, 2019; which claims priority to U.S. Provisional Patent Application No. 62/711,864, filed Jul. 30, 2018, both of which are incorporated by reference herein in their entirety.

BACKGROUND OF THE INVENTION

Oil exists in small pores and narrow fissures within the body of reservoir rocks underneath the surface of the earth. Natural pressure of the reservoir causes the oil to flow up to the surface, thereby providing primary production of an oil well. As oil production progresses, however, the reservoir pressure is depleted to a point at which artificial lift or pumping is required to maintain an economical oil production rate. In these situations, the formation may still contain significant amounts of oil, but the decreased formation pressure reduces the flow capacity of the oil out of the wellbore.

When it is necessary to provide external energy for the reservoir to achieve additional oil recovery (secondary oil recovery), there exist technologies for increasing pressure in a reservoir to "push" the remaining oil to the surface. One method involves injecting gas, e.g., carbon dioxide or nitrogen into an oil reservoir, while another method involves injecting water (waterflooding). The effect is a repressurization of the reservoir, causing oil displacement from trapped capillaries and enhancing mobilization of the oil to the producing wells. While these methods can be useful for producing a certain amount of additional oil, the methods often must overcome the challenges of, for example, low or variable permeability within a formation.

With waterflooding, for example, injected fluids flow preferentially along highly permeable layers, by-passing oil-saturated areas, or oil "islands," in the reservoir. Therefore, an increasing quantity of water rises with the oil and, by decreasing the ratio of oil to water, it eventually becomes uneconomical to continue the process.

Additionally, some hydrocarbon-bearing formations have normal to high porosity, but have low permeability. This means that the formation may contain significant amounts of oil but have small flow channels or limited fractures through which gases and liquids, including oil, could flow. For example, the diatomite reserves in California, Lost Hills and Belridge, contain approximately 10 billion barrels of oil. When intact, the diatomite has porosity of 50-70% and is almost impermeable (0.1-1.0 millidarcy (md)). Oil recovery from this type of formation is usually quite limited using conventional primary and secondary recovery techniques, such as waterflooding, and often must employ hydrofracturing techniques to alter the structure of the rocks.

Low permeability can also be a result of organic and/or inorganic deposits in the formation, such as mineral scales. Scale deposits can occur during water flooding operations, when mineral salts precipitate as a result of injected water or brine coming into contact with other formation fluids or the formation itself, as well as changes in the pressure, composition and/or temperature of the formation or crude oil. Scales can comprise precipitates of, for example, barium sulfate, barium carbonate, calcium carbonate, strontium carbonate, strontium sulfate, calcium sulfate, sodium chloride, silicon dioxide, iron sulfide, iron oxides, iron carbonate, silicates, phosphates and oxides, or any of a number of compounds that are insoluble or mildly soluble in water.

Systematic treatment or removal of deposits is crucial to formation maintenance. As reservoir pressure drops, oil production and flow rates decrease. The slowing of flow rates leads to the buildup of films and chemicals in the pores of the formation, thus reducing permeability and hydrocarbon movement into the wellbore. This can lead to changes in temperature gradients and thus even greater precipitation of deposits, including scale. Thus, the effects are interrelated, cyclical and compounding.

Additional challenges can arise with certain gas injection techniques, which are often technologically difficult to implement. For example, obtaining high volumes of immiscible gas can be costly and might even require constructing a plant for producing the gas at the site of the oilfield. Furthermore, there are costs and safety concerns related to gas compression and pumping, which can require complicated machinery, and the success of oil recovery can be unpredictable in the end due to, for example, variable reservoir characteristics.

One solution to these challenges could be the use of gas-producing microorganisms in Microbial Enhanced Oil Recovery (MEOR). MEOR involves the use of specific bacteria capable of producing useful metabolites in situ, such as gases, acids, surfactants, solvents and polymers, that help with post-primary recovery of residual oil. The production of biogenic gases in situ, which can include carbon dioxide, hydrogen, methane and nitrogen, can help with repressurizing a reservoir, as well as with reduction of the oil viscosity by solution of the gas in the oil. Examples of gas-producing bacteria are *Clostridium, Desulfovibrio, Pseudomonas*, and some methanogens.

While in situ gas production can be useful in that pumping of gas from the surface is not required, the longer a microbiome is permitted to develop within a formation, the greater the risk is for the establishment of microorganisms that produce deleterious metabolites. For example, certain bacteria that grow within a formation produce hydrogen sulfide, carbonic acid and other corrosive metabolites.

The "recoverable reserves" of a particular well are an important measure of how profitable the well will likely be. Reserves are considered recoverable if they are economically and technologically feasible to extract at the existing price of oil and gas. In other words, recoverable reserves are those that can be developed with reasonable certainty under current economic conditions, operating methods and government regulations.

Many wells contain a large volume of reserves that, because of the nature of the formation, remain unrecoverable. The permeability of a subterranean formation, in particular, can have a profound effect on the ability of conventional oil recovery methods to produce the full potential volume of oil from a formation. Low and/or variable permeability formations, for example, often contain saturated oil "islands," which are by-passed by fluids and gases that favor higher permeability channels within the formation.

Because of the billions of gallons of oil that remain unrecovered from these reserves, there is a need in the art for safe, effective, environmentally-friendly, and economical means for increasing recoverable reserves, particularly from formations having low or variable permeability. In particular, there is a need for improved methods of repressurizing subterranean formations.

BRIEF SUMMARY OF THE INVENTION

The subject invention provides environmentally-friendly compositions and methods for enhancing oil recovery using three mechanisms: repressurization of an oil formation; reduction of interfacial tension in the formation; and increase of formation permeability through dissolution of scale and solubilization of carbonate rock in the formation. Advantageously, the subject invention can be used to increase the recoverable reserves in a subterranean formation.

In certain embodiments, the subject invention provides a composition for enhanced oil recovery (EOR). Preferably, the EOR composition comprises a chelating agent, a biosurfactant, a carbonate salt, and water. In one embodiment, the EOR composition further comprises a pH adjuster.

In a specific embodiment, the EOR composition comprises EDTA as the chelating agent, a glycolipid, such as a sophorolipid (SLP), as the biosurfactant, sodium bicarbonate (baking soda) as the carbonate salt, and water. Preferably, the SLP is an acidic form SLP. In one embodiment, the pH adjuster is sodium hydroxide (NaOH).

Advantageously, in specific embodiments, when injected into a subterranean, oil-bearing formation, the composition allows for enhanced oil recovery through at least three mechanisms. These include delayed production of pressurizing gas, e.g., carbon dioxide, with pH-controlled reaction of a carbonate salt; reduction of interfacial tension with inclusion of a biosurfactant, e.g., SLP; and increased permeability of the formation with inclusion of a scale-dissolving and carbonate rock-solubilizing chelating agent, e.g., EDTA.

Further provided is a specific process for producing the subject composition for improved efficacy in enhancing oil recovery, as well as compositions produced according to this process. In general, the process comprises mixing a solution of a chelating agent, a biosurfactant, a carbonate salt, and water, under basic conditions. Advantageously, it has been found that up to 10% sodium bicarbonate can be dissolved in basic solution without releasing carbon dioxide.

More specifically, the process can comprise adding a chelating agent, such as EDTA, to water to form a solution; adding a biosurfactant, preferably an acidic sophorolipid (SLP) composition to the solution; adding a carbonate salt, such as sodium bicarbonate, to the solution; and mixing the solution.

In preferred embodiments, the solution is prepared under basic conditions, meaning a pH adjusting composition is added to the solution. Preferably, the pH adjusting substance is added in an amount that allows for complete dissolution of the chelating agent in the water, which typically requires a pH of at least 9, 10, 11, 12 or greater. The pH adjusting substance can be, for example, sodium hydroxide.

In preferred embodiments, the biosurfactant is produced by dissolving a biosurfactant, e.g., SLP, in water and adding a pH adjuster, e.g., sodium hydroxide, to bring the pH to 8 and convert the SLP to an acidic form.

In a specific embodiment, preparation of the composition comprises: 1) dissolving 20 g/L EDTA in water to form a solution; 2) adding 10 g/L of acidic form SLP thereto; 3) adding 100 g/L sodium bicarbonate thereto; 4) mixing the solution for 40 minutes; and 5) letting the solution rest for 20 more minutes. Preferably, the method comprises adjusting the pH of the solution to at least 9.5, up to pH 10, 11, 12 or greater, by adding an appropriate amount of sodium hydroxide to completely dissolve the EDTA. In certain embodiments, the pH adjusting substance is added at some time before adding the sodium bicarbonate.

Normally, a carbonate salt will ionize in water and will produce carbon dioxide and water when reacted with an acid. The subject composition, however, is prepared in such a way that any reactions can be timed specifically for a controlled release of gas within a formation. Sodium bicarbonate, for example, will not react to form gas when the pH is above 7. When gas production is desired, the composition with the carbonate salt can be mixed with an acid or with acidic brine water to lower the pH.

The subject invention further provides methods for enhancing oil recovery from an oil-bearing subterranean formation utilizing the subject compositions. In one embodiment, the methods comprise first preparing a composition of the subject invention according to the process described herein; preparing an acid solution; and preparing a plugging composition.

In one embodiment, the acid solution is 30% citric acid. In another embodiment, the plugging composition comprises 1.0-1.5% sodium alginate dissolved in water. The plugging composition can also comprise a biopolymer, such as xanthan gum or guar gum.

Next, the methods comprise steps that can be generally characterized as 1) gas release; and 2) plugging.

More specifically, gas release can comprise injecting an EOR composition of the subject invention into the formation. This can either be immediately preceded by or followed by injection of the acid solution in an amount sufficient to reduce the pH of the EOR composition to 7.0 or below, preferably 6.0 or below, which will activate the release of carbon dioxide gas. The time in between application of the EOR composition and the acid solution can be, for example, 5 minutes or less, 2 minutes or less, or even 30 seconds or less.

Next, the method comprises injecting water and/or brine to push the composition and acid solution deep into the formation. Preferably, the injection of water and/or brine is performed quickly (e.g., immediately, or within 5 minutes or less) after the EOR composition comes into contact with the acid solution in order for the reaction that produces carbon dioxide gas to occur as deep into the formation as possible.

The amount of acid solution injected into the formation can vary depending upon the amount of EOR composition that is injected and the acidity of the brine. In one embodiment, no acid solution is injected, for example, when the brine has an acidic pH (e.g., pH of 2 to 3 or lower) that is sufficient to reduce the pH to 7.0 or lower, preferably, 6.0 or lower.

Finally, the method comprises injecting the plugging composition into the fottuation to help with gas and pressure buildup, as well as improve flow of oil from the formation. The plugging composition is preferably in liquid form upon injection, but solidifies when it comes into contact with salts present in the brine and formation. The plugging composition will selectively plug larger pores and channels with some non-selective plugging of smaller pores.

Over time, the plugging composition will wash out on its own throughout the oil production process; however, if desired, the plugging composition can be deliberately washed out using known methods.

In one embodiment, the shut-in time for the EOR composition is dependent upon the time it takes for carbon dioxide to be released, which can depend upon, for example, the porosity of the formation and the speed at which citric acid and the treatment composition diffuse throughout the formation. Preferably, the shut-in time for the subject methods ranges from 1-50 days, more preferably from 3-30 days.

Once carbon dioxide production stops, pumping of oil from the formation can resume after about one or two days.

In one embodiment, the method can be performed in multiple locations within the formation at one time, for example, if it is desirable to have an increased amount of gas or to have more than one area in the formation with increased pressure.

Advantageously, the subject method utilizes microbial metabolites and non-toxic biochemicals for delayed release of carbon dioxide. The carbon dioxide that is dissolved in the subject EOR composition remains dissolved, until the composition reacts with the acid to produce carbon dioxide gas. This occurs only once and in a short period of time. This is advantageous over continuous injection and/or production of carbon dioxide because it reduces the potential for carbonic acid production and corrosion associated therewith.

The subject methods and compositions advantageously can replace current methods of pressurization that utilize pumping of gas into formations, or $CO_2$-producing bacteria, which can lead to establishment of biocorrosive microorganisms. Additionally, the subject invention can be used without releasing large quantities of inorganic compounds into the environment.

Furthermore, the subject compositions and methods utilize components that are biodegradable and toxicologically safe. Thus, the present invention can be used in oil and gas production as a "green" treatment.

DETAILED DESCRIPTION OF THE INVENTION

The subject invention provides environmentally-friendly compositions and methods for enhancing oil recovery using three mechanisms: repressurization of an oil formation; reduction of interfacial tension in the formation; and increase of formation permeability through dissolution of scale and solubilization of carbonate rock in the formation.

Advantageously, the subject invention can be used to increase the recoverable reserves in a subterranean formation.

In certain embodiments, the subject invention provides a composition for enhanced oil recovery (EOR). Preferably, the EOR composition comprises a chelating agent, a biosurfactant, a carbonate salt, and water. In one embodiment, the EOR composition further comprises a pH adjuster.

In a specific embodiment, the EOR composition comprises EDTA as the chelating agent, a glycolipid, such as a sophorolipid (SLP), as the biosurfactant, sodium bicarbonate (baking soda) as the carbonate salt, and water. Preferably, the SLP is an acidic form SLP. In one embodiment, the pH adjuster is sodium hydroxide (NaOH).

Further provided is a specific process for producing the subject composition for optimal efficacy in enhancing oil recovery, as well as compositions produced according to this process. In general, the process comprises mixing a solution of a chelating agent, a biosurfactant, a carbonate salt, and water, under basic conditions. Advantageously, it has been found that up to 10% sodium bicarbonate can be dissolved in basic solution without releasing carbon dioxide. More specifically, the process can comprise adding a chelating agent, such as EDTA, to water to form a solution; adding a biosurfactant, preferably an acidic sophorolipid (SLP) composition to the solution; adding a carbonate salt, such as sodium bicarbonate, to the solution; and mixing the solution.

In preferred embodiments, the solution is prepared under basic conditions, meaning a pH adjusting composition is added to the solution. Preferably, the pH adjusting substance is added prior to addition of the carbonate salt in an amount that allows for complete dissolution of the chelating agent in the water. This typically requires a pH of 9, 10, 11, 12 or greater. The pH adjusting substance can be, for example, sodium hydroxide.

In preferred embodiments, the biosurfactant is produced by dissolving a biosurfactant, e.g., SLP, in water and adding a pH adjuster, e.g., sodium hydroxide, to bring the pH to 8 and convert the SLP to an acidic form.

The subject invention further provides methods for enhancing oil recovery from an oil-bearing subterranean formation utilizing the subject compositions. In one embodiment, the methods comprise first preparing a composition of the subject invention according to the process described herein; preparing an acid solution; and preparing a plugging composition.

In one embodiment, the acid solution is 30% citric acid. In another embodiment, the plugging composition comprises 1.0-1.5% sodium alginate dissolved in water. The plugging composition can also comprise a biopolymer, such as xanthan gum or guar gum.

Next, the methods comprise steps that can be generally characterized as 1) gas release; and 2) plugging. More specifically, gas release can comprise injecting an EOR composition of the subject invention into the formation. This can either be immediately preceded by or followed by injection of the acid solution in an amount sufficient to reduce the pH of the EOR composition to 7.0 or below, preferably 6.0 or below, which will activate the release of carbon dioxide gas.

Next, the method comprises injecting water and/or brine to push the composition and acid solution deep into the formation. In one embodiment, the need for the acid solution is obviated by, for example, the injection of brine that has an acidic pH (e.g., pH of 3.0, 2.5, 2.0 or lower) sufficient to reduce the pH to 7.0 or lower, preferably, 6.0 or lower.

Finally, the method comprises injecting the plugging composition into the formation to help with gas and pressure buildup, as well as improve flow of oil from the formation. The plugging composition is preferably in liquid form upon injection, but solidifies when it comes into contact with salts present in the brine and formation. The plugging composition will selectively plug larger pores and channels with some non-selective plugging of smaller pores.

Selected Definitions

As used herein, the term "biocorrosive bacteria" or "biocorrosive microorganism" means, any taxonomic grouping of bacteria (or microorganism) known to contribute to microbial induced corrosion ("MIC") of metallic and/or non-metallic materials. Non-limiting examples include chemoautotrophs, sulfate-reducing bacteria, iron oxidizing bacteria, sulfur oxidizing bacteria, nitrate reducing bacteria, methanogens, and acid producing bacteria. These bacteria are capable of reducing metal directly, producing metabolic products that are corrosive (e.g., hydrogen sulfide gas), and/or leading to the formation of biofilms that can alter the local environment to promote corrosion.

As used herein, a "biofilm" is a complex aggregate of microorganisms, such as bacteria, wherein the cells adhere to each other and/or to a surface by secreting an extracellular polysaccharide matrix. The cells in biofilms are physiologically distinct from planktonic cells of the same organism, which are single cells that can float or swim in liquid medium.

As used herein, the term "enhanced oil recovery, or "EOR," refers to post-primary recovery of oil from an oil-bearing subterranean formation. Various methods can be utilized in EOR, including, for example, microorganisms, gas and/or water injection and plugging, to increase the movement of oil and/or gas from a formation. EOR can also include well stimulation. As used herein, "harvested" refers to removing some or all of the microbe-based composition from a growth vessel.

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The by-products of growth may be, for example, metabolites, including surfactants and expressed proteins, cell membrane components, and/or other cellular components. The microbes may be intact or lysed. The cells may be present at, for example, a concentration of at least $1 \times 10^4$, $1 \times 10^5$, $1 \times 10^6$, $1 \times 10^7$, $1 \times 10^8$, $1 \times 10^9$, $1 \times 10^{10}$, or $1 \times 10^{11}$ or more CFU per milliliter of the composition. Furthermore, the cells may be separated, i.e., removed, from the broth in which they were cultivated such that the composition comprises cell-free broth with cellular growth by-products.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, such as plant hormones, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "permeability" of a porous rock formation is the measure of the ability of fluid to pass through the rock. Permeability is measured in darcies (D), wherein 1 D is the permeability of a porous medium with a cross-sectional area of 1 $cm^2$ and a length of 1 cm, through which the passage of 1 $cm^3$ of fluid with viscosity of 1 cp, flows in 1 second under a pressure differential of 1 atm. Permeability depends upon the porosity of a formation (the higher the porosity the higher the permeability) and the connectivity of the pore spaces. The size and shape of grains, the grain size distribution, and other factors such as the wetting properties of the rock and the presence of pore-blocking deposits can also influence permeability. Permeability can vary from 1 nanodarcy (nD) to 1 microdarcy (mD) for granites, shales and clays, to several D for extremely permeable reservoir rocks. Reservoir permeability can be classified as low or fair (<10 mD), high (10-100 mD), very high (100-1,000 mD), and exceptional (>1,000 mD), where rock with permeability of 1 mD or less is not considered reservoir rock unless subjected to manipulation (e.g., through fracking).

As used herein, a "stripper well" or "marginal well" refers to a mature oil well that is depleted, or nearing the end of its economically useful life. Marginal oil wells are generally characterized in that their daily production of crude oil has dropped to between 10 and 15 barrels per day, or less, for any twelve-month period. These wells often go abandoned prematurely, leaving behind hundreds or even thousands of barrels of valuable and useful crude oil.

As used herein, "surfactant" refers to a compound that lowers the surface tension (or interfacial tension) between two liquids or between a liquid and a solid. Surfactants can act as, for example, detergents, wetting agents, emulsifiers, foaming agents, and/or dispersants. A surfactant produced by microorganisms is referred to as a "biosurfactant."

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

Other features and advantages of the invention will be apparent from the following description of the preferred embodiments thereof, and from the claims. All references cited herein are hereby incorporated by reference.

Compositions of the Subject Invention

The subject invention provides environmentally-friendly compositions and methods for enhancing oil recovery using three mechanisms: repressurization of an oil formation; reduction of interfacial tension in the formation; and increase of formation permeability through dissolution of scale and solubilization of carbonate rock in the formation. Advantageously, the subject invention can be used to increase the recoverable reserves in a subterranean formation.

In certain embodiments, the subject invention provides a composition for enhanced oil recovery (EOR). Preferably, the EOR composition comprises a chelating agent, a biosurfactant, a carbonate salt, and water. In one embodiment, the EOR composition further comprises a pH adjuster.

In a specific embodiment, the EOR composition comprises EDTA as the chelating agent, a glycolipid, such as a sophorolipid (SLP), as the biosurfactant, sodium bicarbonate (baking soda) as the carbonate salt, and water. Preferably, the SLP is an acidic form SLP. In one embodiment, the pH adjuster is sodium hydroxide (NaOH).

Advantageously, when injected into a subterranean, oil-bearing formation, the composition allows for enhanced oil recovery through three mechanisms. These include delayed production of pressurizing gas, e.g., carbon dioxide, with pH-controlled reaction of a carbonate salt; reduction of interfacial tension with inclusion of a biosurfactant, e.g., SLP; and increased permeability of the formation with inclusion of a scale-dissolving and carbonate rock-solubilizing chelating agent, e.g., EDTA.

In preferred embodiments, the EOR composition comprises a chelator or chelating agent. As used herein, "chelator" or "chelating agent" means an active agent capable of removing a metal ion from a system by forming a complex so that, for example, the metal ion cannot readily participate in or catalyze oxygen radical formation.

Examples of chelating agents suitable for the present invention include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine and ethylenediaminetetraacetic acid (EDTA).

Advantageously, the chelating agent enhances the efficacy of the EOR composition by dissolving mineral scale build-up that can clog pores and oil well equipment, as well as solubilizing carbonate rock to increase the permeability of a formation.

The concentration of chelating agent in the composition can be about 5 g/L to 50 g/L or more, about 10 g/L to about 30 g/L, or about 15 g/L to about 25 g/L. In specific embodiments, the chelating agent is EDTA at a concentration of about 20 g/L.

The subject EOR composition can further comprise a substance for reducing the interfacial tension within a subterranean formation, thereby promoting formation wettability and flow of oil. Preferably, the substance is one or more biosurfactants.

Biosurfactants are a structurally diverse group of surface-active substances produced by microorganisms. Biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces.

Biosurfactants accumulate at interfaces, thus reducing interfacial tension and leading to the formation of aggregated micellular structures in solution. This, combined with the characteristics of low toxicity and biodegradability, means that biosurfactants are advantageous for use in the oil and gas industry.

Biosurfactants include low molecular weight glycolipids, lipopeptides, flavolipids, phospholipids, and high molecular weight polymers such as lipoproteins, lipopolysaccharide-protein complexes, and polysaccharide-protein-fatty acid complexes. The hydrocarbon chain of a fatty acid acts as the common lipophilic moiety of a biosurfactant molecule, whereas the hydrophilic part is formed by ester or alcohol groups of neutral lipids, by a carboxylate group of fatty acids or amino acids (or peptides), an organic acid in the case of flavolipids, or, in the case of glycolipids, by a carbohydrate.

Microbial biosurfactants are produced by a variety of microorganisms such as bacteria, fungi, and yeasts. Exemplary biosurfactant-producing microorganisms include those listed below, including, and/or in addition to, *Pseudomonas* species (*P. aeruginosa, P. putida, P. florescens, P. fragi, P. syringae*); *Flavobacterium* spp.; *Starmerella* spp., *Bacillus* spp. (*B. subtilis, B. pumillus, B. cereus, B. licheniformis*); Psueudozyma spp.; *Pichia* spp.; *Wickerhamomyces* spp.; *Candida* spp. (*C. albicans, C. rugosa, C. tropicalis, C. lipolytica, C. torulopsis*); *Rhodococcus* spp.; *Arthrobacter* spp.; *Campylobacter* spp.; Cornybacterium spp. and so on. The biosurfactants may be obtained by fermentation processes known in the art.

In one embodiment, the biosurfactants utilized according to the subject invention are obtained through cultivation processes ranging from small to large scales. These cultivation processes include, but are not limited to, submerged cultivation/fermentation, solid state fermentation (SSF), and hybrids, modifications and/or combinations thereof.

In some embodiments, the biosurfactants of the subject composition are in a purified form. In some embodiments, the biosurfactants are utilized in crude form. Crude form biosurfactants can take the form of a liquid mixture comprising biosurfactant sediment in fermentation broth resulting from cultivation of a biosurfactant-producing microbe. This crude form biosurfactant solution can comprise from about 0.001% to about 99%, about 1% to about 90%, about 5% to about 80%, about 25% to about 75%, about 30% to about 70%, from about 35% to about 65%, from about 40% to about 60%, from about 45% to about 55%, or about 50% pure biosurfactant.

Preferably, cultivation is performed in a system that is distributed to a location that is at or near the site of application. For example, a local production facility can be installed at, or within 100 miles of, the oil well where the subject invention will be applied.

In certain embodiments, the one or more biosurfactants of the EOR composition can include glycolipids such as, for example, sophorolipids (SLP), rhamnolipids (RLP), mannosylerythritol lipids (MEL), trehalose lipids (TL), cellobiose lipids, or a combination thereof. The biosurfactants can also include lipopeptides, such as, for example, surfactin, lichenysin, fengycin, arthrofactin and iturin.

In certain embodiments, the biosurfactant is a glycolipid, preferably a SLP. Sophorolipids consist of a hydrophobic fatty acid tail of 16 or 18 carbon atoms and a hydrophilic carbohydrate head comprising sophorose. One terminal or sub terminal hydroxylated fatty acid is ß-glycosidically linked to the sophorose molecule. The carboxylic end of this fatty acid is either free (acidic or open form) or internally esterified at the 4", or in some rare cases, at the 6'- or 6"-position (lactonic form). The properties of the SLP can be significantly influenced by the form of the SLP (i.e., acidic or lactonic).

The concentration of biosurfactant(s) in the composition can be about 1 g/L to 30 g/L or more, about 5 g/L to about 20 g/L, or about 10 g/L to about 15 g/L. In specific embodiments, the biosurfactant is SLP at a concentration of about 10 g/L.

Preferably, the SLP is in an acidic form. Acidic SLP can be produced by dissolving the SLP in water and adding a pH adjuster, e.g., sodium hydroxide, to bring the pH to 8.

In some embodiments, the composition further comprises a carbonate salt. Carbonates are made from reaction between carbonic acid (aqueous carbon dioxide) and a base (or alkali). Carbonate salts, which herein include bicarbonate salts, are generally considered weak bases. Examples of carbonate salts useful according to the present invention include but are not limited to ammonium bicarbonate, barium carbonate, cesium bicarbonate, calcium bicarbonate, magnesium bicarbonate, magnesite, potassium bicarbonate, sodium percarbonates, sodium carbonate, sodium bicarbonate.

In preferred embodiments, the carbonate salt is sodium bicarbonate. Preferably, the concentration of sodium bicarbonate is about 20 g/L to 200 g/L, about 50 g/L to 150 g/L, or about 75 g/L to about 125 g/L. In a specific embodiment, the sodium bicarbonate concentration is 100 g/L.

In one embodiment, the FOR composition further comprises a pH adjuster. Suitable pH adjusting substances can include, for example, potassium hydroxide, ammonium hydroxide, potassium carbonate or bicarbonate, sodium hydroxide, or mixtures thereof. In preferred embodiments, the pH adjuster is sodium hydroxide. The amount of sodium hydroxide in the composition depends upon the quantity needed to dissolve the chelating agent completely.

The subject invention further provides a specific process for producing the subject EOR composition for optimal efficacy in enhancing oil recovery, as well as compositions produced according to this process. In general, the process comprises mixing a solution of a chelating agent, a biosurfactant, a carbonate salt, and water, under basic conditions. Advantageously, it has been found that up to 10% of sodium bicarbonate can be dissolved in basic solution without releasing carbon dioxide.

More specifically, the process can comprise adding a chelating agent, such as EDTA, to water to form a solution; adding a biosurfactant, preferably an acidic sophorolipid (SLP) composition to the solution; adding a carbonate salt, such as sodium bicarbonate, to the solution; and mixing the solution.

In preferred embodiments, the solution is prepared under basic conditions, meaning a pH adjusting composition is added to the solution prior to addition of the carbonate salt. Preferably, the pH adjusting substance is added in an amount that allows for complete dissolution of the chelating agent in the water, which typically requires a pH of at least 9, 10, 11, 12 or greater. The pH adjusting substance can be, for example, sodium hydroxide.

In preferred embodiments, the biosurfactant is produced by dissolving a biosurfactant, e.g., SLP, in water and adding a pH adjuster, e.g., sodium hydroxide, to bring the pH to 8 and convert the SLP to an acidic form.

In a specific embodiment, preparation of the composition comprises: 1) dissolving 20 g/L EDTA in water to form a solution; 2) adding 10 g/L of acidic form SLP to the solution; 3) adding 100 g/L sodium bicarbonate to the solution; 4) mixing the solution for 40 minutes; and 5) letting the solution rest for 20 more minutes. Preferably, the method comprises, sometime after 1) but before 3), adjusting the pH of the solution to at least 9.5, up to pH 10, 11, 12 or greater, by adding an appropriate amount of sodium hydroxide to completely dissolve the EDTA.

Normally, a carbonate salt will ionize in water and will produce carbon dioxide and water when reacted with an acid. The subject composition, however, is prepared in such a way that any reactions can be timed specifically for a controlled release of gas within a formation. Sodium bicarbonate, for example, will not react to form gas when the pH is above 7. When gas production is desired, the composition with the carbonate salt can be mixed with an acid or with acidic brine water to lower the pH.

Methods for Enhanced Oil Recovery

The subject invention further provides methods for enhancing oil recovery from an oil-bearing subterranean formation utilizing the subject compositions. In preferred embodiments, the formation has fair or low permeability, such as that found in diatomite formations, or is heterogeneous with certain areas of fair or low permeability. In a specific embodiment, the formation has a permeability of 10 mD or lower.

In one embodiment, the methods comprise first preparing a composition of the subject invention according to the process described herein; preparing an acid solution; and preparing a plugging composition.

In one embodiment, the acid solution is 30% citric acid. In another embodiment, the plugging composition comprises 1.0-1.5% sodium alginate dissolved in water. The plugging composition can also comprise a biopolymer, such as xanthan gum or guar gum.

Next, the methods comprise steps that can be generally characterized as 1) gas release; and 2) plugging.

More specifically, gas release can comprise injecting an EOR composition of the subject invention into the formation. This can either be immediately preceded by or followed by injection of the acid solution in an amount sufficient to reduce the pH of the EOR composition to 7.0 or below, preferably 6.0 or below, which will activate the release of carbon dioxide gas. The time in between application of the EOR composition and the acid solution can be, for example, 5 minutes or less, 2 minutes or less, or even 30 seconds or less.

Next, the method comprises injecting water and/or brine to push the composition and acid solution deep into the formation. Preferably, the injection of water and/or brine is performed quickly (e.g., immediately, or within 5 minutes or less) after the EOR composition comes into contact with the acid solution in order for the reaction that produces carbon dioxide gas to occur as deep into the formation as possible.

The amount of acid solution injected into the formation can vary depending upon the amount of EOR composition that is injected and the acidity of the brine. In one embodiment, no acid solution is injected, for example, when the brine has an acidic pH (e.g., pH of 2 to 3 or lower) that is sufficient to reduce the pH to 7.0 or lower, preferably, 6.0 or lower.

Finally, the method comprises injecting the plugging composition into the formation to help with gas and pressure buildup, as well as improve flow of oil from the formation. The plugging composition is preferably in liquid form upon injection, but solidifies when it comes into contact with salts present in the brine and formation. The plugging composition will selectively plug larger pores and channels with some non-selective plugging of smaller pores.

Over time, the plugging composition will wash out on its own throughout the oil production process; however, if desired, the plugging composition can be deliberately washed out using known methods.

In one embodiment, the shut-in time for the EOR composition is dependent upon the time it takes for carbon dioxide to be released, which can depend upon, for example, the porosity of the formation and the speed at which citric acid and the treatment composition diffuse throughout the formation. Preferably, the shut-in time for the subject methods ranges from 1-50 days, more preferably from 3-30 days.

Once carbon dioxide production stops, pumping of oil from the formation can resume after about one or two days.

In one embodiment, the method can be performed in multiple locations within the formation at one time, for example, if it is desirable to have an increased amount of gas or to have more than one area in the formation with increased pressure.

Advantageously, the subject method utilizes microbial metabolites and non-toxic biochemicals for delayed release of carbon dioxide. The carbon dioxide that is dissolved in the subject EOR composition remains dissolved, until the composition reacts with the acid to produce carbon dioxide gas. This occurs only once and in a short period of time. This is advantageous over continuous injection and/or production of carbon dioxide because it reduces the potential for carbonic acid production and corrosion associated therewith.

As used herein, "applying" a composition or product refers to contacting it with a target or site such that the composition or product can have an effect on that target or site. The effect can be due to, for example, microbial growth and/or the action of a biosurfactant or other growth by-product. For example, the microbe-based compositions or products can be injected into oil wells and/or the piping, pumps, tanks, etc. associated with oil wells and the transmission, storage and/or refining of oil and/or gas.

The composition can be applied in an amount of at least 1,000 barrels, preferably in amounts of at least 500 barrels, even more preferably in the amount of 80 barrels total. In some embodiments, the composition is applied in a range between 80 and 1,000 BBLS, depending on, for example, the depth of the well and the amount of carbon dioxide release is desired.

The subject methods and compositions advantageously can replace current methods of pressurization that utilize pumping of gas into formations, or $CO_2$-producing bacteria, which can lead to establishment of sulfate-reducing bacteria or other potentially corrosive or deleterious microorganisms. Additionally, the subject invention can be used without releasing large quantities of inorganic compounds into the environment. Furthermore, the subject compositions and methods utilize components that are biodegradable and toxicologically safe. Thus, the present invention can be used in oil and gas production (and other industries) as a "green" treatment.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Determination of Solubility of Sodium Bicarbonate

Initial experiments were performed to determine the solubility of sodium bicarbonate in different solutions and to find the most suitable acid for converting an amount of dissolved sodium bicarbonate into carbon dioxide gas. It was determined that citric acid is acceptable for initiating the reaction. The process takes place according to the formula:

$$H3C6H5O7(aq) + 3NaHCO_3(aq) \rightarrow Na3C6H5O7(aq) + 3H2O(l) + 3\ CO2(g)$$

Accordingly, 1 mole of citric acid reacts with 3 moles of sodium bicarbonate to produce 3 moles of carbon dioxide, meaning that 1 kg of sodium bicarbonate fully reacts with 762.7 g citric acid to produce 270.25 L of carbon dioxide. From these calculations, it was determined that sodium bicarbonate can be dissolved in basic solution up to 10% without releasing carbon dioxide.

Example 2—Preparation of the Treatment Composition

The EOR composition of the subject invention is prepared according to the following steps:
 1. 20 g/L EDTA is added to water;
 2. 10 g/L acidic SLP is added to the water;
 3. Sodium hydroxide is added until all remaining EDTA is dissolved
 4. 100 g/L sodium bicarbonate is added to the water;
 5. The solution is mixed for 40 minutes;
 6. The solution is left to rest for 20 minutes;

The solution has a pH of approximately 9.5, which is crucial for the proper timing of carbon dioxide release when injected into a well. The color is colorless to slightly yellow, and the solution is clear, with no dispersion.

Example 3—Release of Carbon Dioxide with Addition of Acid

Figure 1A:
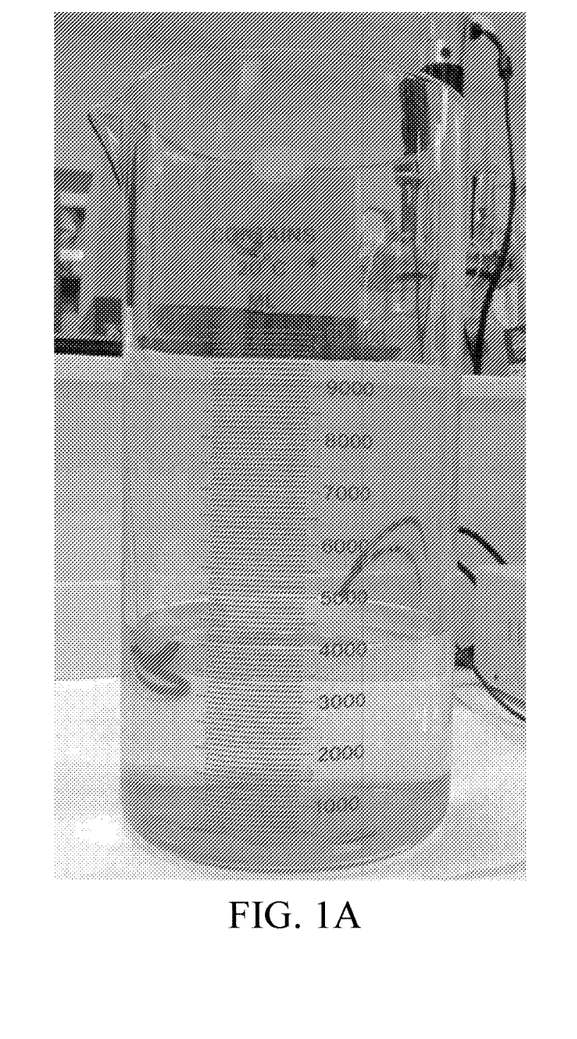
FIGS. 1A-1B show the appearance of the subject EOR composition before (1A) and after (1B) adding 200 ml of 30% citric acid.
Figure 1B:
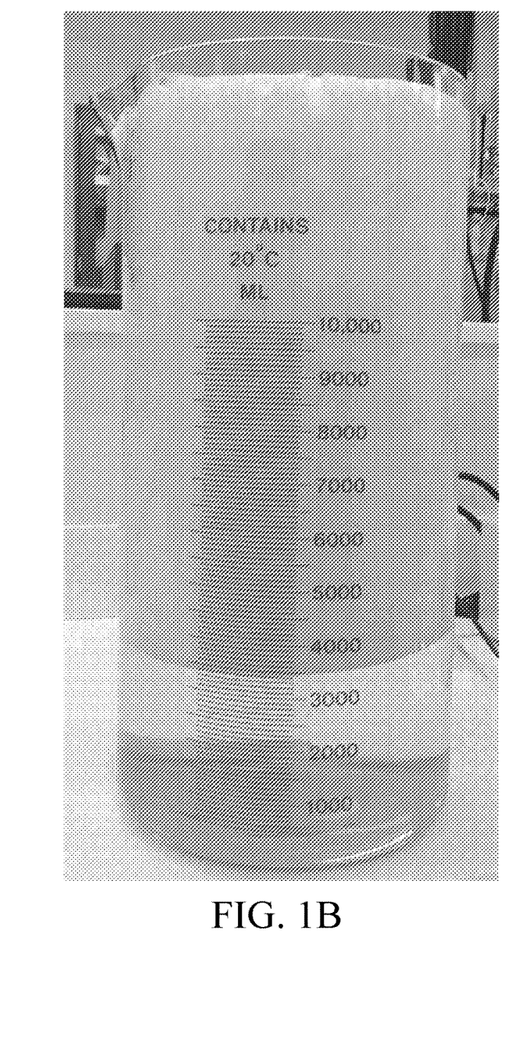

As shown in FIG. 1A, there is no release of carbon dioxide with the EOR composition as it is prepared in Example 2. In FIG. 1B, however, where 200 ml of 30% citric acid is added into 4 L of the EOR composition, a powerful release of carbon dioxide takes place.

The addition of 200 ml of 30% citric acid was repeated 11 times, and gas was released after each of these repetitions. It was concluded that the formulation is stable (with no release of carbon dioxide) and mixing with citric acid produces large amounts of carbon dioxide from sodium bicarbonate.

Example 4—Gas Release Compared with Meor

Experimental work was conduction using aged sand containing oil with API gravity of 32.3. To produce the aged sands, 700 ml of oil are mixed with 5.5 kg of sand (13%) in cylinders and "aged" at 60° C. for 3 days.

An EOR composition of the subject invention is added to one cylinder having aged sands therein. The other cylinder comprises an MEOR, yeast-based treatment. The gas releasing capabilities of the two treatments are tested by adding citric acid to the cylinders.

Figure 2A:
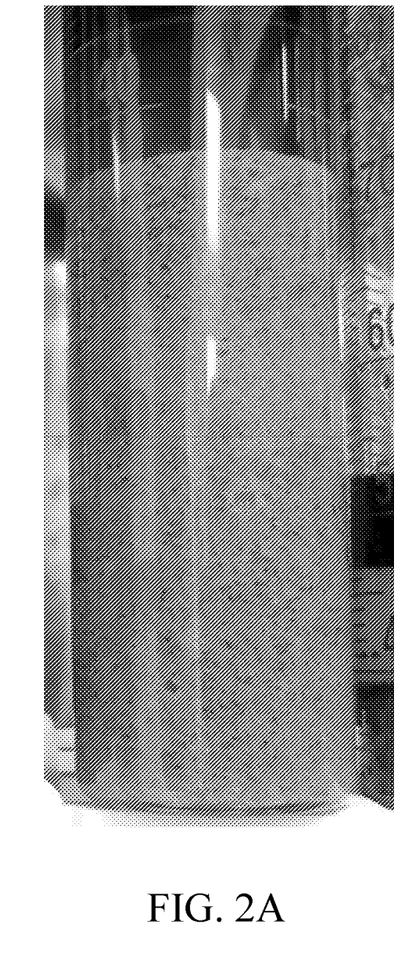
FIGS. 2A-2B show the difference between aged sands treated with a standard MEOR treatment (1A) versus sands treated with an EOR composition of the subject invention (1B). The sands treated with the EOR composition (1B) produced more carbon dioxide gas, as can be seen with the pockets of air that formed in the sand
Figure 2B:
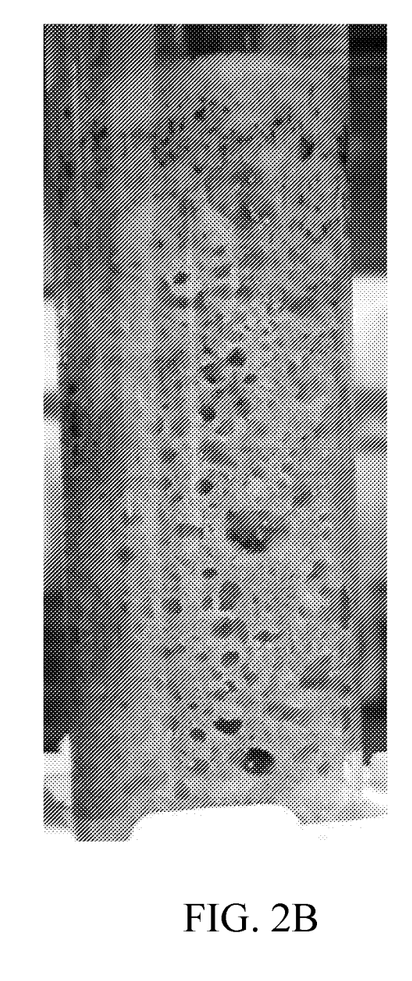

FIG. 2B shows the carbon dioxide release from sands treated with an EOR composition of the subject invention, whereas FIG. 2A shows the sands treated with the MEOR treatment. The EOR test tube displays large pockets of air, indicating carbon dioxide release, whereas the MEOR test tube displays more compact sands, indicating less carbon dioxide release.

Example 5—Comparative Study of Oil Recovery

Three different treatments are compared for recovery of oil from aged sands prepared as described in Example 4:
1. 30 g of sand added to 20 ml of water.
2. 30 g of sand added to 20 ml of yeast fermentation product.
3. 30 g of sand added to 20 ml of EOR composition.

Figure 3A:
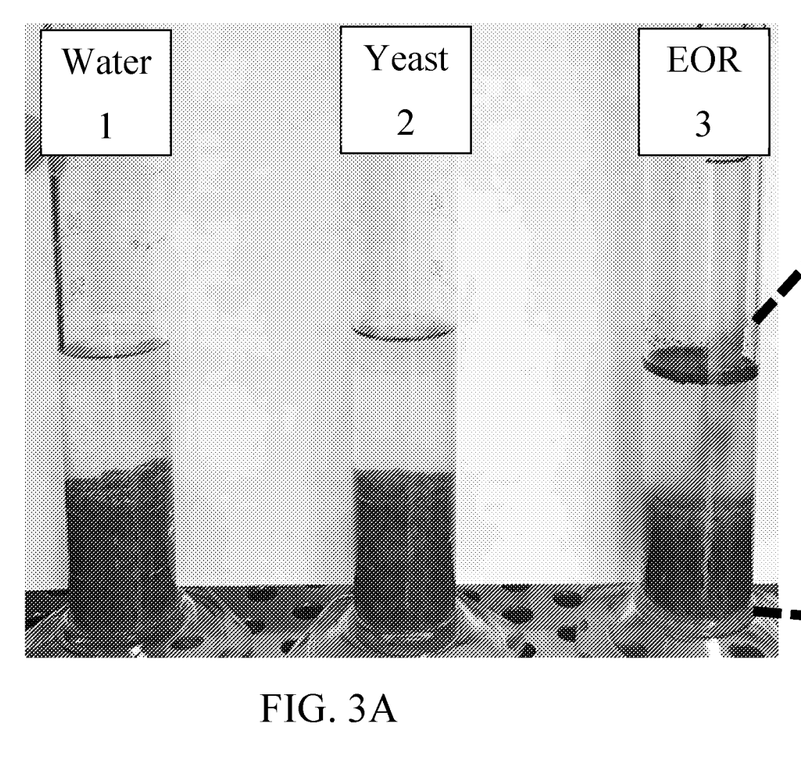
FIGS. 3A-3B show a comparative study of carbon dioxide release from three different treatments of the H-sand in test tubes, shown side-by-side in 3A. The first treatment was a water control, the second treatment was a yeast MEOR product, and the third treatment (magnified in 3B) was an EOR composition of the subject invention. After the addition of citric acid to the tubes, carbon dioxide bubbles immediately released from the sands in the third test tube and continued releasing past 4.5 hours.
Figure 3B:
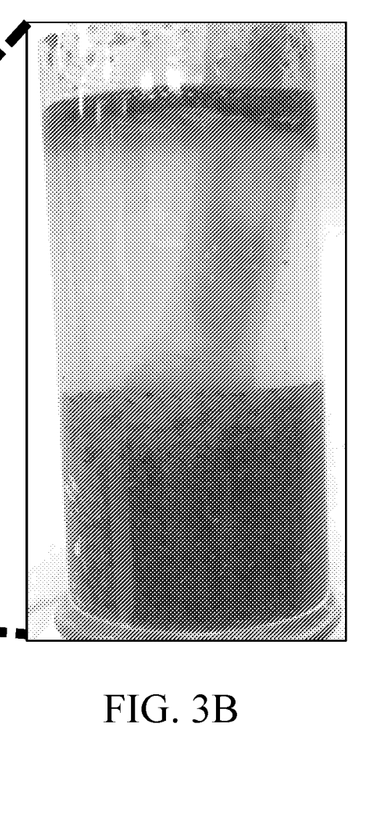

Citric acid (30%, 3 ml) is added to each. Carbon dioxide was released immediately after contacting the test tubes with citric acid. After 4.5 hours (FIGS. 3A-3B), the EOR composition continued to release carbon dioxide in the third treatment tube.

Example 6—Gas Release Using Pre-Treatment with Acid and Alginate Plugging

Experiments were conducted to mimic oil movement through a capillary system to increase permeability and determine the effect of adding acid into an oil well prior to application of the EOR composition of the subject invention. The experiments also aimed to determine a suitable plugging composition that would help promote lateral release of carbon dioxide in the formation and prevent back-channeling of carbon dioxide after the treatment formulation mixes with the acid.

A cylinder was filled with 60 g of aged sand as prepared in Example 4. Citric acid (6 ml) was added through a silicone tube to make the sand acidic. The cylinder was then plugged by a 1.5% alginate solution, which was not completely dissolved. Two holes were made in the alginate "cup" that formed to allow for gas release. The plugging material proved effective to handle the pressure produced by the carbon dioxide.

Finally, 20 ml of EOR solution were added through the silicone tube, after which gas release continued for more than 4 hours. The sample was left overnight and afterwards, produced 8 ml, or about 90% of the oil, on top of the alginate cup through the holes.

Figure 4A:
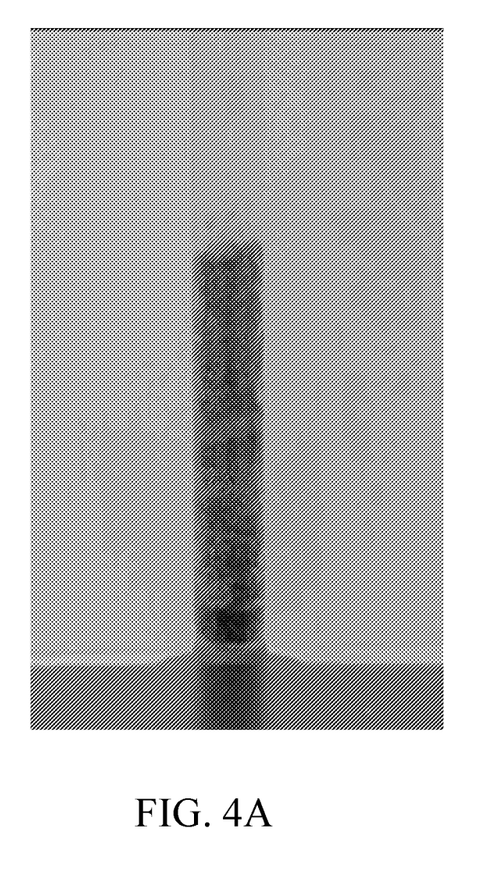
FIGS. 4A-4B show oil recovery from aged sands pretreated with an acid solution and plugged with an alginate solution having holes therein (4A), as well as the oil recovered from the sands after treatment with an EOR composition according to the subject invention (4B).
Figure 4B:
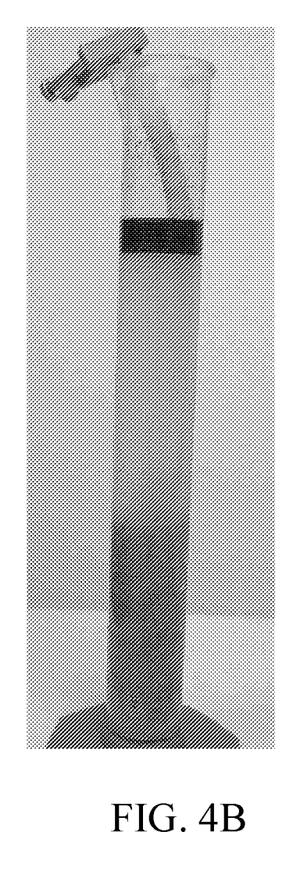

FIG. 4A shows the gas release after addition of the EOR composition through the holes in the alginate cup, while FIG. 4B shows the oil recovered on top of the plug after about 4 hours.

We claim:

1. A method for enhancing oil recovery from an oil-bearing subterranean formation, the method comprising obtaining a composition comprising EDTA (ethylenediaminetetraacetic acid), a sophorolipid biosurfactant, sodium bicarbonate, and water, adding an amount of sodium hydroxide to the composition sufficient to adjust the pH of the composition to at least about 9.5;
   injecting the composition into the formation,
   injecting an acid solution into the formation, wherein the acid solution is added at a quantity such that the pH of the composition is reduced to 7.0 or below and causes the controlled release of carbon dioxide gas inside the formation,
   injecting a plugging composition comprising 1.0-1.5% sodium alginate dissolved in water into the formation, and
   wherein the formation pressure is increased.

2. The method of claim 1, wherein the acid solution is injected prior to injection of the composition.

3. The method of claim 1, wherein the acid solution is injected after injection of the composition.

4. The method of claim 1, further comprising injecting water or brine to push the composition and acid solution deep into the formation.

5. The method of claim 1, wherein the acid solution is water or brine having a pH of 3.0 or below.

6. The method of claim 1, wherein the plugging composition further comprises one or more biopolymers selected from xanthan gum and guar gum.

7. The method of claim 1, further comprising shutting the formation for 3 to 30 days.

8. The method of claim 1, wherein once carbon dioxide release has stopped inside the formation, pumping of oil begins after about 1 to 2 days.

9. The method of claim 1, wherein the formation has a permeability of 10 mD or lower.

* * * * *

UNITED STATES PATENT AND TRADEMARK OFFICE
CERTIFICATE OF CORRECTION

| | |
|---|---|
| PATENT NO. | : 11,549,053 B2 |
| APPLICATION NO. | : 17/264830 |
| DATED | : January 10, 2023 |
| INVENTOR(S) | : Sean Farmer et al. |

It is certified that error appears in the above-identified patent and that said Letters Patent is hereby corrected as shown below:

In the Specification

Column 4,
Line 52, "the fottuation" should read -- the formation --.

Column 11,
Line 5, "f3- glycosidically" should read -- β- glycosidically --.
Line 37, "the FOR composition" should read -- the EOR composition --.

Page 1 of 1

Signed and Sealed this
Thirtieth Day of May, 2023

*Katherine Kelly Vidal*

Katherine Kelly Vidal
*Director of the United States Patent and Trademark Office*